(No Model.)
T. B. OLLIS.
TRIMMING FRAME.
No. 343,191. Patented June 8, 1886.
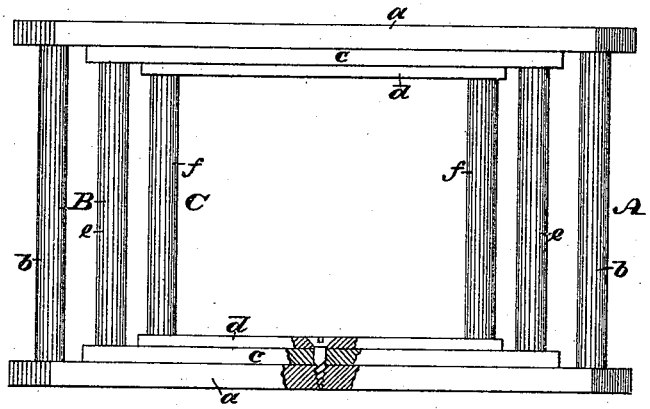
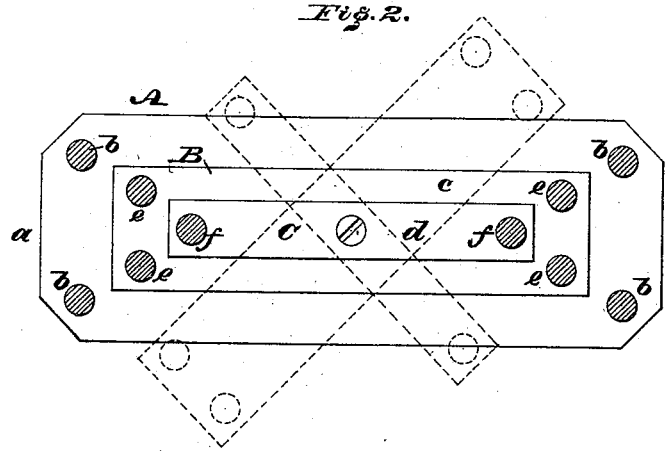
WITNESSES:
INVENTOR: Thomas B. Ollis,
BY _____ ATTORNEY.

UNITED STATES PATENT OFFICE.

THOMAS B. OLLIS, OF PHILADELPHIA, PENNSYLVANIA.

TRIMMING-FRAME.

SPECIFICATION forming part of Letters Patent No. 343,191, dated June 8, 1886.

Application filed October 1, 1884. Serial No. 144,475. (No model.)

*To all whom it may concern:*

Be it known that I, THOMAS B. OLLIS, a citizen of the United States, residing in the city and county of Philadelphia, State of Pennsylvania, have invented a new and useful Improvement in Trimming-Frames, which improvement is fully set forth in the following specification and accompanying drawings, in which—

Figure 1 represents a side elevation of a trimming-frame embodying my invention. Fig. 2 represents a section thereof in line $x$ $x$, Fig. 1.

Similar letters of reference indicate corresponding parts in the two figures.

My invention consists of a frame constructed in such manner that trimming may be wound on the frame without liability to injuriously press or crush the same, said frame having rotatable sections, one within the other, the operation whereof being hereinafter fully set forth.

Referring to the drawings, A represents a frame consisting of the side pieces, $a$ $a$, and rounds $b$ $b$ at the end thereof.

B represents a frame within the frame A, pivoted to the side pieces, $a$ $a$, and C represents a frame within the frame B, which may be pivoted thereto, but in the present case is shown as having common pivots with the frame B, it being seen that said frames B C are movable on their pivots independent of the frame A, and likewise independent of each other.

The frames B C are formed of side pieces, $c$ $d$, and end rounds, $e f$, respectively, it being noticed that the rounds $e$ spread from the rounds $f$, and the rounds $b$ spread from the rounds $e$.

The operation is as follows: The frame C is turned at an angle to the frame A, so that either of its rounds $f$ is presented, and the end of the trimming is connected therewith or held thereon, after which the trimming is wound on said frame by rotating the latter. When a proper length of the trimming is wound on the frame C, the frame B is turned at an angle to the frame A, and the winding of the trimming continued on said frame B by rotating the latter. Then, when the frame B is supplied, the trimming is wound around the frame A, and thus the trimming is wound in a continuous length around the three frames in separate layers, which do not press, crush, or otherwise injure each other, the original shape and good condition of the trimming being thereby preserved.

While I show two pivoted or swinging frames, it is evident that the number thereof may be increased or diminished, as desired.

Having thus described my invention, what I claim as new, and desire to secure by Letters Patent, is—

1. A frame for trimmings, having side pieces and rounds at each end of said side pieces, and provided with two or more inner frames pivotably connected to the outer frames and to each other, substantially as described.

2. A frame for trimmings, consisting of side pieces, $a$, and rounds $b$ $b$ at each end, and frame B, having side pieces, $c$, and rounds $e$ $e$ at each end, and frame C, having side pieces, $d$, and round $f$ at each end, said frame B being pivotably connected to the frame A, and said frame C being pivotably connected to said frame B, the rounds $e$ $b$ spreading from the rounds $f$, substantially as and for the purpose described.

THOMAS B. OLLIS.

Witnesses:
JOHN A. WIEDERSHEIM,
A. P. GRANT.